Patented June 8, 1954

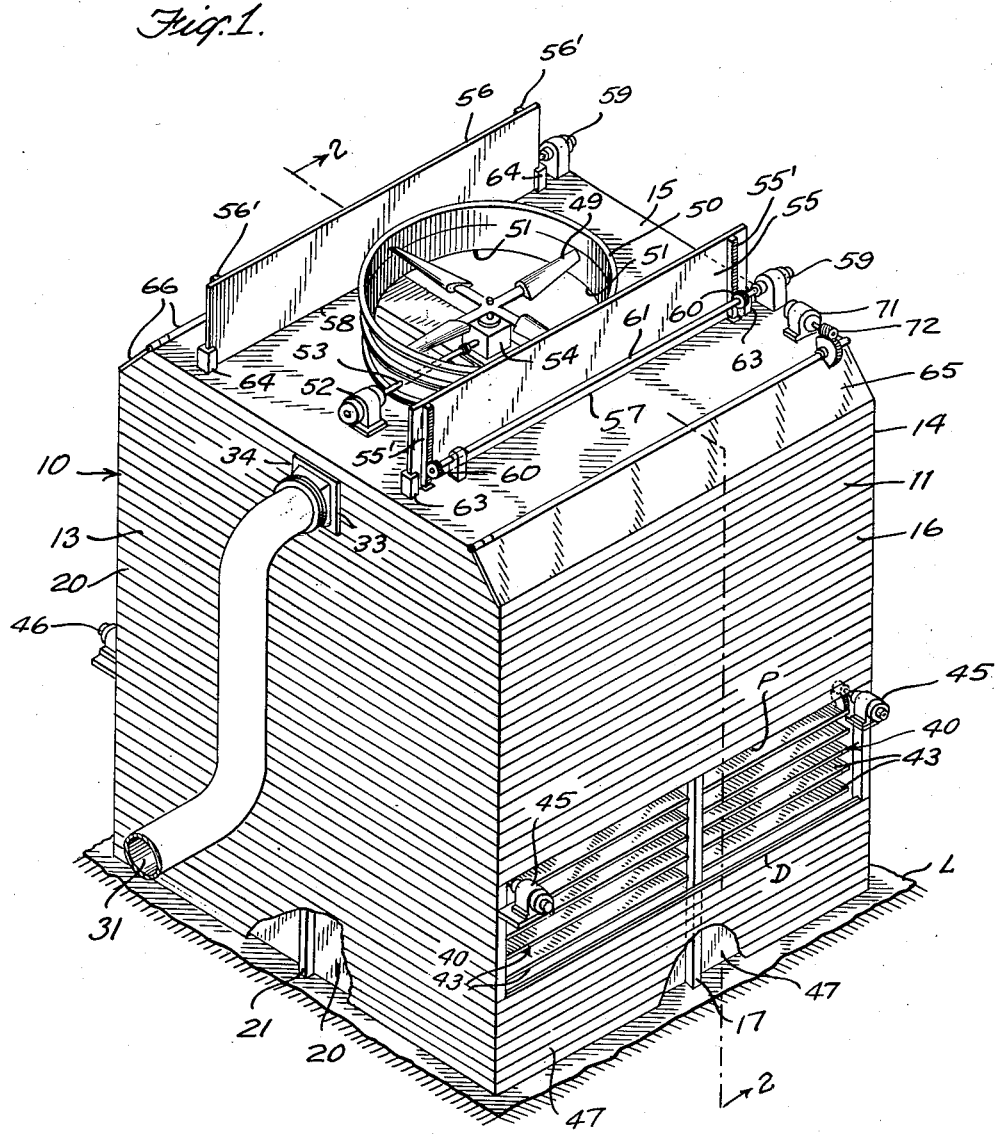

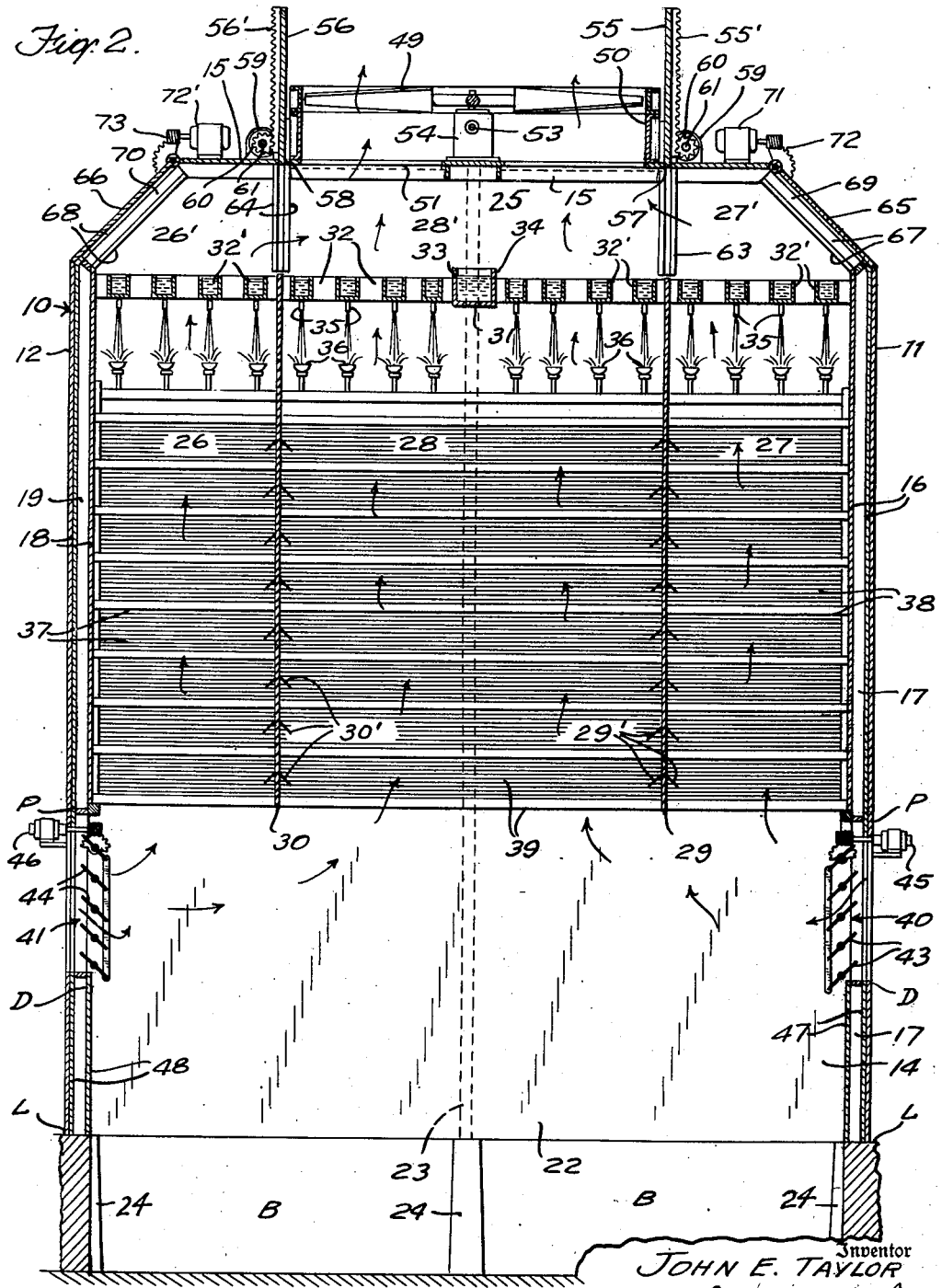

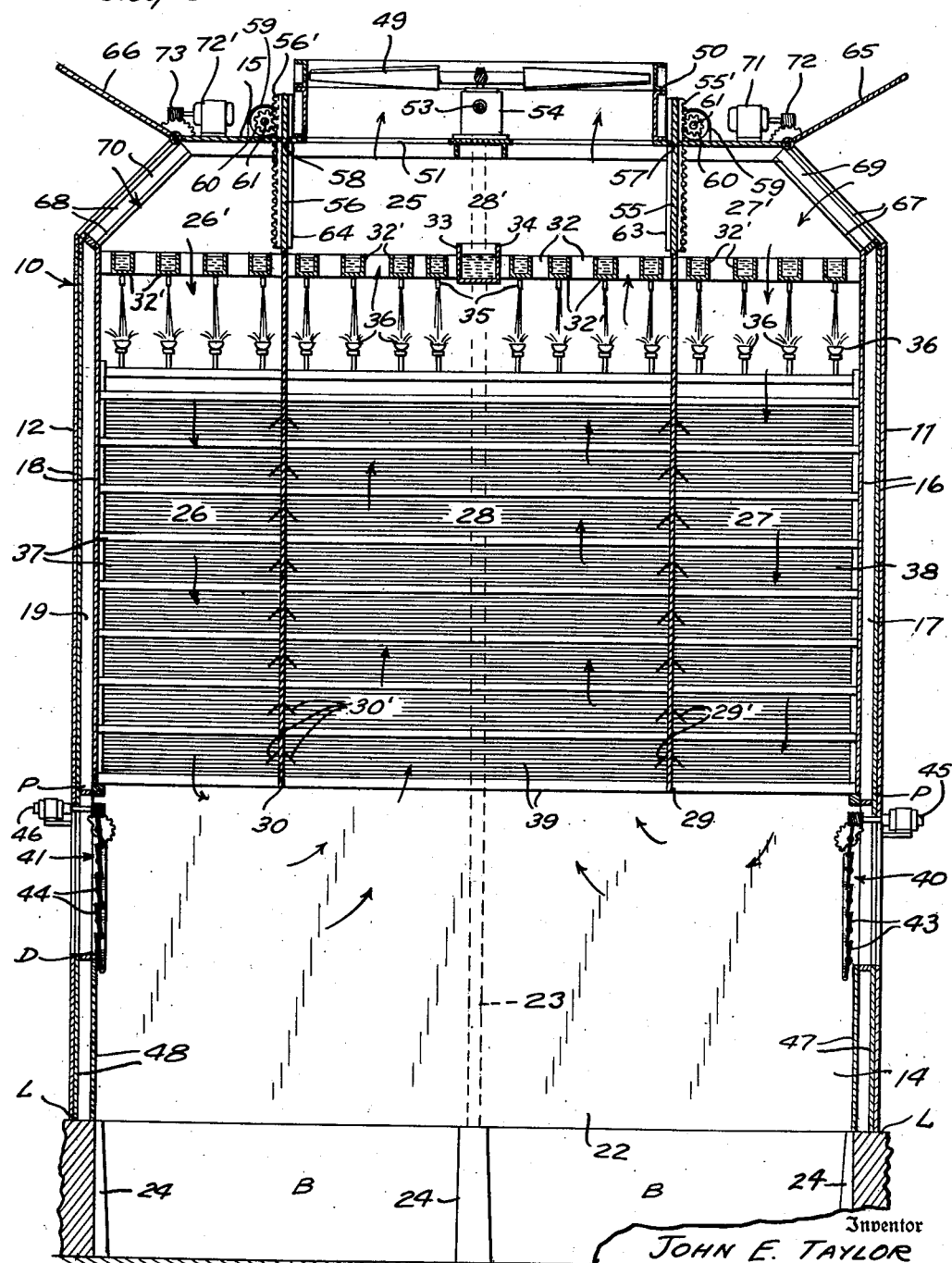

2,680,603

UNITED STATES PATENT OFFICE 2,680,603

COOLING TOWER

John E. Taylor, Kansas City, Mo., assignor to Foster Wheeler Corporation, New York, N. Y., a corporation of New York Application November 6, 1951, Serial No. 255,032

9 Claims. (Cl. 261—22)

This invention relates to vapor and liquid contact apparatus and more particularly to mechanical draft cooling towers wherein heat from a liquid is dissipated to the atmosphere.

This invention has as one object the provision of a cooling tower which will operate efficiently the year round, regardless of the change in temperature of atmospheric air due to seasonal changes.

Another object of this invention is to prevent freezing of liquid in an induced draft type cooling tower when it is cooled by contact with very cold atmospheric air entering the tower.

Another object of this invention is to provide a cooling tower having a convertible air flow which may be made to flow concurrently with the water entering the tower, or countercurrently to the flow of water.

Heretofore, the conventional induced draft type cooling tower has been limited in efficiency during normal seasonal changes because no provision has been made for preventing the freezing of water when it comes in contact with cold atmospheric air entering the tower during the winter season. Normally in cooling towers of the type to which the present invention relates, air is drawn through louvres at the bottom of the tower and is passed upwardly over tower fill through which warm water passes downwardly and in heat exchange relationship with the air so that the water will be cooled. The warm water is distributed to the fill through a plurality of distributing troughs disposed in the upper part of the tower above the fill. This usual arrangement functions properly in warm climates or during the months when the air entering the tower is not so cold as to freeze the water which passes through the fill.

The present invention provides a tower having louvres at the lower part thereof, which louvres are constructed to be opened and closed, and having hinged gates at the upper part thereof, which gates are adapted to be opened or closed. The fill is divided into a plurality of laterally arranged passes by baffles having baffle gates at the upper part thereof which are opened so that air flows upwardly through the passes in parallel or which are closed so that air flows serially through a plurality of passes.

During the winter months the louvres at the lower part of the tower are closed and the gates at the upper part of the tower are opened to permit cold air to enter the tower and meet the warmest water which also enters the upper part thereof. The baffle gates in the top of the tower are closed at this time. Air entering the upper part of the tower flows downwardly in one pass and then upwardly in an adjacent pass.

During the summer months, the louvres at the lower part of the tower are opened, while the hinged gates at the upper part of the tower are closed, and sliding baffle gates at the upper part of the baffles are in an upward or opened position. Air then passes through the louvres into the bottom portion of the tower and flows upwardly in the passes through the fill in contact with water passing downwardly through the fill from the water distributing troughs and splash cups.

The invention, together with its various features and objects, will be best understood by reference to the accompanying drawings in which:

Fig. 1 is an isometric view in elevation of a cooling tower embodying the present invention with the parts thereof positioned for operation during warm seasons of the year;

Fig. 2 is a vertical sectional view taken on the line 2—2 of Fig. 1 with the various parts thereof positioned for operation during warm seasons of the year;

Fig. 3 is a view similar to Fig. 2 but with the various parts thereof positioned for operation of the tower during cold seasons of the year.

Like characters of reference refer to like parts throughout the views.

Referring to the drawings, the reference character 10 designates a cooling tower cell which comprises opposite sides 11 and 12, and opposite ends 13 and 14 and a roof 15.

The opposite sides and ends have sheathing attached to vertical extending posts spaced from one and other along said sides and ends. Sheathing 16 of side 11 is attached to spaced vertical posts 17, sheathing 18 of side 12 is attached to posts 19, while sheathing 20 of end 13 is attached to posts 21 and sheathing 22 of end 14 is attached to posts 23. The posts 17, 19, 21 and 23 at the bottom thereof are positioned in foundations 24 extending into the ground. The posts project upwardly from said foundations to the roof 15 of the cell. The opposite sides and ends are covered by sheathings 16, 18, 20 and 22 from a point P in spaced relationship with the ground level L to the roof 15 which enclose a chamber 25 between the opposite ends and opposite sides of the tower. Chamber 25 extends in height between the point P and roof 15 which roof covers the top of the chamber. The bottom of chamber 25 is open and is in spaced relationship with the ground level L.

Chamber 25 is divided into three separate laterally adjoining passes 26, 27 and 28 by laterally spaced partitions extending longitudinally of the tower between opposite ends 13 and 14. The pass 26 is defined along one side by sheathing 18 and along the other side thereof by vertical partition 30 extending longitudinally of the tower between opposite ends 13 and 14, while pass 27 is defined along one side thereof by sheathing 16 and along the other side by vertical partition 29 which also extends between opposite ends 13 and 14, and pass 28 is defined at the opposite sides thereof by vertical partitions 29 and 30. Partitions 29 and 30, as shown, have small deflector plates 29' and 30' respectively for redistributing water which might otherwise tend to run down the partition and are so spaced from one another and the sides of the cooling tower cell adjacent thereto that the width of pass 28 is substantially greater than the width of passes 26 and 27. Partitions 29 and 30 extend from point P to a point short of the roof of the cell leaving a normally undivided space above passes 26, 27 and 28 comprising upper portions 26', 27' and 28'.

A water distributing conduit 31 is attached to the upper portion of end wall 13 and positioned within pass 28 in the upper portion thereof. Distributing troughs or gutters 32 extend laterally from opposite sides 33 and 34 of conduit 31 at right angles to said conduit and transversely of the laterally disposed passes 26, 27 and 28 in the upper part thereof. Longitudinally extending feeder troughs 32' communicate with and project longitudinally from troughs 32. Distributing troughs 32 and feed troughs 32' are disposed at a level adjacent the upper part of conduit 31 so that water from said conduit will drain from the upper part thereof into the troughs. Downspouts 35 extend downwardly from the bottom of troughs 32' and discharge into splash plates 36 wherein water is atomized and thereafter drops onto fill. Water from the troughs 32' in pass 26 drops onto fill 37 in said pass, while water from the troughs 32' in pass 27 drops onto fill 38 in pass 27, and water from troughs 32' in pass 28 drops onto fill 39 in pass 28. The fill in pass 26, 27 and 28 in chamber 25 extends between end walls 13 and 14 and transversely in pass 26 between sheathing 18 and partition 30, transversely in pass 27 between sheathing 16 and partition 29, and transversely in pass 28 between partitions 29 and 30. The top of the fill is at a point closely adjacent and below splash plates 36, while the bottom thereof is closely adjacent point P.

Sides 11 and 12 have louvres 40 and 41 respectively positioned in the lower portion thereof, from a point D in spaced relationship with the ground level L, extending vertically to a point short of P where sheathing 16 in side 11 and sheathing 18 in side 12 begins. Louvres 40 and 41 have shutters 43 and 44 respectively, inserted in them and means such as motors 45 and 46 to open and close the shutters. Both the louvres and shutters extend longitudinally in sides 11 and 12 to opposite end walls 13 and 14. Side walls 11 and 12 have sheathing 47 and 48 respectively, extending longitudinally to opposite end walls 13 and 14, from a point closely below the louvres to ground level L.

The tower has a fan 49 disposed in a fan housing 50, mounted on the roof, and is disposed over an opening 51 in said roof. Fan 49 is driven by a motor 52 mounted on the roof, shaft 53 and gearing housed in 54 as shown in Fig. 1. Fan 49 and opening 51 are positioned in alignment with the central pass 28 of chamber 25.

Baffles 55 and 56 are disposed in vertical alignment with partitions 29 and 30 respectively and are mounted for vertical movement on opposite sides of fan 49. The baffles are coextensive in length with partitions 29 and 30 and are of such height as to extend from the top of the partitions through the roof 15 when in their closed position, as shown in Fig. 3. Baffles 55 and 56 extend through slots 57 and 58 in the roof and are slidably mounted at the opposite ends thereof in guides 63 and 64 respectively. At opposite ends thereof, baffles 55 and 56 have pinion rack 55' and 56' positioned thereon (see Fig. 1) which enmesh with pinions 60 mounted on shafts 61 actuated by motors 59 or other suitable means which rotation moves the baffles vertically into and out of the positions shown in Figs. 3 and 2 respectively, as will hereinafter be fully described.

Hinged gates 65 and 66, sloping downwardly from roof 15 toward sides 11 and 12, are mounted in frames 67 and 68 respectively, which frames are disposed in openings 69 and 70. Opening 69 is formed between side 11, opposite ends 13 and 14, and roof 15 while opening 70 is formed between side 12, opposite ends 13 and 14 and roof 15. Gates 65 and 66 extend longitudinally between opposite ends 13 and 14. Motor 71 and worm mechanism 72 swing hinged gate 65 to open and close opening 69, while motor 72' and worm mechanism 73 swing gate 66 to open and close opening 70.

In operation of the present invention during periods of the year when the atmospheric temperature outside the tower is sufficiently high as to not freeze the droplets of water in the tower the baffles 55 and 56, gates 65 and 66, and shutters 43 and 44 of louvres 40 and 41 are in the positions shown in Figs. 1 and 2. That is, shutters 43 and 44 are in opened position to permit air from outside the tower to flow therethrough into the bottom of passes 26, 27 and 28 while gates 65 and 66 are closed to prevent passage of air into or out of the cell through openings 69 and 70. Baffles 55 and 56 are in their uppermost position so that fan 49 will draw air through passes 26, 27 and 28 in parallel flow, the air flowing through the fill in passes 26, 27 and 28, thence passing therefrom into upper portions 26', 27' and 28' respectively of said passes. From upper portions 26', 27' and 28' the air is drawn outwardly of the cell and discharged into the atmosphere by fan 49. Water to be cooled in the cooling tower is passed from troughs 32' downwardly through downspouts 35 into contact with splash plates 36 by which water is atomized, the droplets thereafter passing downwardly through fill 37, 38 and 39 countercurrent to and in direct heat exchange relationship with the upwardly flowing air. The water is thusly cooled prior to passing into basin B.

In operation of the present invention during seasons of the year when the temperature of the outside atmosphere is sufficiently cold to freeze water droplets in the cell, the louvres 40 and 41 are closed, as shown in Fig. 3; hinged gates 65 and 66 are in an open or upward position, and baffles 55 and 56 are in their downward or closed position. Water to be cooled is passed through distribution conduit 31 and distributed to distribution troughs 32. From troughs 32' the water flows downwardly through downspouts 35 into contact with splash plates 36 by which water is atomized and passes onto fill 37, 38 and 39, and thereafter to basin B.

Fan 49 driven by motor 52, shaft 53 and gearing housed in 54 causes air to enter the tower through openings 69 and 70, passing downwardly in passes 27' and 27, from opening 69, thence through fill 38, while passing downwardly in passes 26 and 26' from opening 70, through fill 37. Air in passes 26 and 27 flows concurrent to and in direct heat exchange relationship with water flowing downwardly through fill 37 and 38. Thereafter the air from passes 26 and 27 enters pass 28 at the bottom thereof and is drawn upwardly through fill 39 in space 28 and between troughs 32, passing outwardly of the cooling tower through opening 51 in the roof of the tower. It will be noted that the cold air entering the tower through openings 69 and 70 first passes in heat exchange relationship with the water of highest temperature in the tower and flows downwardly in passes 26 and 27, the water becoming cooled and the air in said passes becoming preheated prior to passage into pass 28 wherein it flows upwardly and countercurrent to the descending water. Since the entering cold air first passes in heat exchange relationship with water of the highest temperature in the tower, said water will not become frozen.

The form of the invention selected for illustration is a preferred form, changes may be made in the form location and relative arrangement of the several parts of the cooling tower disclosed without departing from the principles of the invention.

What is claimed is:

1. A mechanical draft cooling tower comprising means forming a cell, a fill disposed within the cell wherein air and liquid pass in direct heat exchange relationship with one another, said cell having an upper air space above the fill and a lower air space beneath the fill, partition means dividing the fill into a plurality of laterally adjacent passages, said passages being in communication at the opposite ends thereof with said upper and lower air spaces respectively, liquid distributing means above the fill through which liquid to be cooled is distributed to the fill, air inlet means in communication with one of said air spaces and the atmosphere at the part of the tower adjacent thereto, damper means controlling the flow of air through said air inlet into the one air space, other air inlet means in communication with the other air space and the atmosphere at the part of the tower adjacent thereto, other damper means controlling the flow of air through said other air inlet into the other air space, an exhaust air outlet in communication with said other of the air spaces and the atmosphere, an exhaust fan associated with the exhaust air outlet so as to withdraw air from said other air space, and air flow control means operable from one position to another position for controlling the flow of air through said other air space into the passages, said air flow control means being so constructed and arranged as to permit air from the other air space to pass through the passages in series to said exhaust air outlet when said control means is in said one position and to permit air from said one air space to pass through the passages in parallel to said exhaust air outlet when said control means is in said other position.

2. A mechanical draft cooling tower comprising means forming a cell, a fill disposed within the cell wherein air and liquid pass in direct heat exchange relationship with one another, said cell having an upper air space above the fill and a lower air space beneath the fill, partition means dividing the fill into a plurality of laterally adjacent passages, said passages being in communication at the opposite ends thereof with said upper and lower air spaces respectively, liquid distributing means above the fill through which liquid to be cooled is distributed to the fill, air inlet means in communication with one of said air spaces and the atmosphere at the part of the tower adjacent thereto, damper means controlling the flow of air through said air inlet into the one air space, other air inlet means in communication with the other air space and the atmosphere at the part of the tower adjacent thereto, other damper means controlling the flow of air through said other air inlet into the other air space, an exhaust air outlet in communication with said other of the air spaces and the atmosphere, an exhaust fan associated with the exhaust air outlet so as to withdraw air from said other air space, and air flow control means operable from one position to another position for controlling the flow of air through said other air space into the passages, said air flow control means being so constructed and arranged as to permit air from the other air space to pass through the passages in series to said exhaust air outlet when said control means is in said one position and to permit air from said one air space to pass through the passages in parallel to said exhaust air outlet when said control means is in said other position, the arrangement being such that the air flow control means is positioned to permit flow of air through the passages in parallel when said one damper means is positioned to admit air to said one space and said other damper means is positioned to prevent air from entering said other space and to permit air from said other space to flow therefrom through the passages in series when said other damper means is positioned to permit air to enter said other air space and said one damper means is positioned to prevent air from entering said one air space.

3. An induced draft cooling tower comprising means forming a cell, a fill disposed within the cell wherein air and liquid pass in direct heat exchange relationship with one another, said cell having an upper air space above the fill and a lower air space beneath the fill, partition means dividing the fill into a plurality of laterally adjacent passages, said passages being in communication at the opposite ends thereof with said upper and lower air spaces respectively, liquid distributing means above the fill through which liquid to be cooled is distributed to the fill, upper air inlet means in communication with the upper air space and the atmosphere at the upper part of the tower, damper means controlling the flow of air through said air inlet into the upper air space, other air inlet means in communication with the lower air space and the atmosphere at the lower part of the tower, other damper means controlling the flow of air through said lower air inlet into the lower air space, an exhaust air outlet in communication with said upper air space and the atmosphere, an exhaust fan associated with the exhaust air outlet so as to withdraw air from said upper air space, and air flow control means operable from one position to another position for controlling the flow of air through said upper air space into the passages, said air flow control means being so constructed and arranged as to permit air from the upper air space to pass through the passages in series to said exhaust air outlet when said control means is in said one position and to permit air from said lower air space to pass through the passages in parallel to said exhaust air outlet when said control means is in said other position, the arrangement being such that the air flow control means is positioned to permit flow of air through the passages in parallel when said other damper means is positioned to admit air to said lower space and said one damper means is positioned to prevent air from entering said upper space and to permit air from said upper space to flow therefrom through the passages in series when said one damper means is positioned to permit air to enter said upper air space and said other damper means is positioned to prevent air from entering said lower air space.

4. An induced draft cooling tower comprising means forming a cell, a fill disposed within the cell wherein air and liquid pass in direct heat exchange relationship with one another, said cell having an upper air space above the fill and a lower air space beneath the fill, partition means dividing the fill into a central pass and laterally adjacent passages at opposite sides of the central passage, said passages being in communication at the opposite ends thereof with said upper and lower air spaces respectively, liquid distributing means above the fill through which liquid to be cooled is distributed to the fill, air inlet means in communication with one of said air spaces adjacent the laterally adjacent passages and the atmosphere at the part of the tower adjacent thereto, damper means controlling the flow of air through said air inlet into the one air space, other air inlet means in communication with said other air space and the atmosphere at the part of the tower adjacent thereto, other damper means controlling the flow of air through said other air inlet into the other air space, an exhaust air outlet in substantial vertical alignment with said central passage and in communication with said other of the air spaces and the atmosphere, an exhaust fan associated with the exhaust air outlet so as to withdraw air from said other air space, and air flow control means operable from one position to another position for controlling the flow of air through said other air space into the passages, said air flow control means being so constructed and arranged as to permit air from the other air space to pass through a laterally adjacent passage and the central passage in series to said exhaust air outlet when said control means is in said one position and to permit air from said one air space to pass through all of the passages in parallel to said exhaust air outlet when said control means is in said other position, the arrangement being such that the air flow control means is positioned to permit flow of air through all the passages in parallel when said one damper means is positioned to admit air to said one space and said other damper means is positioned to prevent air from entering said other space and to permit air from said other space to flow therefrom through a laterally adjacent passage and the central passage in series when said other damper means is positioned to permit air to enter said other air space and said one damper means is positioned to prevent air from entering said one air space.

5. An induced draft cooling tower comprising means forming a cell, a fill disposed within the cell wherein air and liquid pass in direct heat exchange relationship with one another, said cell having an upper air space above the fill and a lower air space beneath the fill, partition means dividing the fill into a central passage and laterally adjacent passages at opposite sides of the central passage, said passages being in communication at the opposite ends thereof with said upper and lower air spaces respectively, liquid distributing means above the fill through which liquid to be cooled is distributed to the fill, upper air inlet means in communication with the upper air space adjacent the laterally adjacent passages and the atmosphere at the upper part of the tower, damper means controlling the flow of air through said air inlet into the upper air space, other air inlet means in communication with the lower air space and the atmosphere at the lower part of the tower, other damper means controlling the flow of air through said lower air inlet into the lower air space, an exhaust air outlet in substantial vertical alignment with said central passage and in communication with said upper air space and the atmosphere, an exhaust fan associated with the exhaust air outlet so as to withdraw air from said upper air space, and air flow control means operable from one position to another position for controlling the flow of air through said upper air space into the passages, said air flow control means being so constructed and arranged as to permit air from the upper air space to pass through said laterally adjacent passages and the central passage in series to said exhaust air outlet when said control means is in said one position and to permit air from said lower air space to pass through the passages in parallel to said exhaust air outlet when said control means is in said other position, the arrangement being such that the air flow control means is positioned to permit flow of air through the passages in parallel when said other damper means is positioned to admit air to said lower space and said one damper means is positioned to prevent air from entering said upper space and to permit air from said upper space to flow therefrom through the passages in series when said one damper means is positioned to permit air to enter said upper space and said other damper means is positioned to prevent air from entering said lower air space.

6. An induced draft cooling tower comprising means forming a cell, a fill disposed within the cell wherein air and liquid pass in direct heat exchange relationship with one another, said cell having an upper air space above the fill and a lower air space beneath the fill, partition means dividing the fill into a plurality of laterally adjacent passages, said passages being in communication at the opposite ends thereof with said upper and lower air spaces respectively, liquid distributing means above the fill through which liquid to be cooled is distributed to the fill, air inlet means in communication with one of said air spaces and the atmosphere at the part of the tower adjacent thereto, damper means controlling the flow of air through said air inlet into the one air space, other air inlet means in communication with the other air space and the atmosphere at the part of the tower adjacent thereto, other damper means controlling the flow of air through said other air inlet into the other air space, an exhaust air outlet in communication with said other of the air spaces and the atmosphere, an exhaust fan associated with the exhaust air outlet, so as to withdraw air from said other air space, and air flow control means for controlling the flow of air through said other air space into the passages, said air flow control means comprising a gate cooperating with each of the partitions and coextensive therewith at the top thereof, said gates being movable into and out of opened and closed positions, the gates in a closed position dividing said upper air space into passages corresponding to the passages in the fill therebeneath thereby preventing air from said other air inlet means from flowing from one passage of the fill to another through the upper air space and in an opened position permitting the flow of air from the passages to the exhaust air opening through said upper air space.

7. An induced draft cooling tower comprising means forming a cell, a fill disposed within the cell wherein air and liquid pass in direct heat exchange relationship with one another, said cell having an upper air space above the fill and a lower air space beneath the fill, partition means dividing the fill into a central pass and laterally adjacent passages at opposite sides of the central pass, all of said passages being in communication at the opposite ends thereof with said upper and lower air spaces respectively, liquid distributing means above the fill through which liquid to be cooled is distributed to the fill, upper air inlet means in communication with the upper air space adjacent the laterally adjacent passages and the atmosphere at the upper part of the tower, damper means controlling the flow of air through said air inlet into the upper air space, other air inlet means in communication with the lower air space and the atmosphere at the lower part of the tower, other damper means controlling the flow of air through said lower air inlet into the lower air space, an exhaust air opening in substantial vertical alignment with said central passage and in communication with said upper air space and the atmosphere, an exhaust fan associated with the opening so as to withdraw air from said upper air space, and air flow control means for controlling the flow of air through said upper air space into the passages, said air flow control means comprising a gate cooperating with each of the partitions and coextensive therewith at the top thereof, said gates being movable upwardly into an opened position and downwardly into a closed position, said gates in a closed position dividing the upper air space into passages corresponding to the passages in the fill therebeneath thereby permitting air from the upper air space to pass through said laterally adjacent passages and the central passage in series to said exhaust air opening and in their opened position to permit air from said lower air space to pass through the passages in parallel to said exhaust air opening, the arrangement being such that the air flow control means are positioned to permit flow of air through the passages in parallel when said other damper means is positioned to admit air to said lower space and said one damper means is positioned to prevent air from entering said upper space and to permit air from said upper space to flow therefrom through the passages in series when said one damper means is positioned to permit air to enter said upper air space and said other damper means is positioned to prevent air from entering said lower air space.

8. A mechanical draft cooling tower comprising means forming a cell, a fill disposed within the cell wherein air and liquid pass in direct heat exchange relationship with one another, said cell having an upper space above the fill and a lower space beneath the fill, liquid distributing means above the fill through which liquid to be cooled is distributed to the fill, partition means dividing the fill into a plurality of laterally adjacent passages, said passages being in communication at the opposite ends thereof with said upper and lower air spaces respectively, said tower having an air inlet adapted to be opened and closed, said air inlet in its open position being in communication with one of said air spaces and the atmosphere at the part of the tower adjacent thereto and in its closed position being adapted to prevent air from entering said one space, another air inlet in said tower adapted to be opened and closed, said other air inlet in its open position being in communication with the other of said air spaces and the atmosphere at the part of the tower adjacent thereto and in its closed position being adapted to prevent air from entering said other space, an exhaust air outlet in communication with said other of the air spaces and the atmosphere, an exhaust fan associated with the exhaust air outlet so as to withdraw air from said other air space, and air flow control means operable from one position to another position for controlling the flow of air through said other air space into the passages, said air flow control means being so constructed and arranged as to permit air from the other air space to pass through the passages in series to said exhaust air outlet when said control means is in said one position and to permit air from said one air space to pass through the passages in parallel to said exhaust air outlet when said control means is in said other position.

9. A mechanical draft cooling tower comprising means forming a cell, a fill disposed within the cell wherein air and liquid pass in direct heat exchange relationship with one another, said cell having an upper space above the fill and a lower space beneath the fill, liquid distributing means above the fill through which liquid to be cooled is distributed to the fill, partition means dividing the fill into a central passage and laterally adjacent passages at opposite sides of the central passage, said passages being in communication at the opposite ends thereof with said upper and lower air spaces respectively, said tower having an air inlet adapted to be opened and closed, said air inlet in its open position being in communication with one of said air spaces adjacent the laterally adjacent passages and the atmosphere at the part of the tower adjacent thereto and in its closed position being adapted to prevent air from entering said one space, another air inlet in said tower adapted to be opened and closed, said other air inlet in its open position being in communication with the other of said air spaces and the atmosphere at the part of the tower adjacent thereto and in its closed position being adapted to prevent air from entering said other space, an exhaust air outlet in substantial vertical alignment with said central passage and in communication with said other of the air spaces and the atmosphere, an exhaust fan associated with the exhaust air outlet so as to withdraw air from said other air space, and air flow control means operable from one position to another position for controlling the flow of air through said other air space into the passages, said air flow control means being so constructed and arranged as to permit air from the other air space to pass through a laterally adjacent passage and the central passage in series to said exhaust air outlet when said control means is in said one position and to permit air from said one air space to pass through all the passages in parallel to said exhaust air outlet when said control means is in said other position.

References Cited in the file of this patent

UNITED STATES PATENTS

| Number | Name | Date |
|---|---|---|
| 753,573 | Hettinger | Mar. 1, 1904 |
| 1,172,429 | Carrier | Feb. 22, 1916 |
| 1,181,644 | Clarke | May 2, 1916 |
| 1,610,255 | Burham | Dec. 14, 1926 |
| 2,136,003 | Coey | Nov. 8, 1938 |
| 2,512,271 | Green | June 20, 1950 |

FOREIGN PATENTS

| Number | Country | Date |
|---|---|---|
| 304,645 | Italy | Jan. 13, 1933 |